(12) United States Patent
Moon et al.

(10) Patent No.: US 11,741,356 B2
(45) Date of Patent: Aug. 29, 2023

(54) DATA PROCESSING APPARATUS BY LEARNING OF NEURAL NETWORK, DATA PROCESSING METHOD BY LEARNING OF NEURAL NETWORK, AND RECORDING MEDIUM RECORDING THE DATA PROCESSING METHOD

(71) Applicant: Korea Advanced Institute of Science and Technology, Daejeon (KR)

(72) Inventors: Jaekyun Moon, Daejeon (KR); Sung Whan Yoon, Daejeon (KR); Jun Seo, Daejeon (KR)

(73) Assignee: Korea Advanced Institute of Science & Technology

( * ) Notice: Subject to any disclaimer, the term of this patent is extended or adjusted under 35 U.S.C. 154(b) by 1060 days.

(21) Appl. No.: 16/431,319

(22) Filed: Jun. 4, 2019

(65) Prior Publication Data

US 2020/0257970 A1    Aug. 13, 2020

(30) Foreign Application Priority Data

Feb. 8, 2019 (KR) .......... 10-2019-0014684
Feb. 27, 2019 (KR) .......... 10-2019-0023479
May 2, 2019 (KR) .......... 10-2019-0051364

(51) Int. Cl.
*G06N 3/08* (2023.01)
*G06N 20/10* (2019.01)
*G06T 9/00* (2006.01)
*G06T 11/00* (2006.01)
(Continued)

(52) U.S. Cl.
CPC .......... *G06N 3/08* (2013.01); *G06F 18/2451* (2023.01); *G06N 20/10* (2019.01); *G06T 9/001* (2013.01);
(Continued)

(58) Field of Classification Search
None
See application file for complete search history.

(56) References Cited

U.S. PATENT DOCUMENTS 10,885,277 B2 * 1/2021 Ravi ............... G06N 3/063
2019/0341050 A1 * 11/2019 Diamant .......... G06V 40/172
(Continued)

FOREIGN PATENT DOCUMENTS

CN    110133558 A  *  8/2019  .......... A61B 5/055
CN    110168542 A  *  8/2019  .......... G06F 16/3347
(Continued)

OTHER PUBLICATIONS

Snell et al., Prototypical Networks for Few-Shot Learning, 31st Conference on Neural Information Processing Systems (NIPS) (Year: 2017).*
(Continued)

*Primary Examiner* — Mohammed Rachedine
(74) *Attorney, Agent, or Firm* — Foley & Lardner LLP

(57) ABSTRACT

A data processing method by learning of a neural network may be provided. The data processing method by the learning of a neural network includes: obtaining a first set of output values by processing a first set of input values of a task by the neural network; forming a projection space on the basis of the first set of output values; obtaining a second set of output values by processing a second set of input values out of input values of the task by the neural network; projecting the second set of output values onto the projection space; and performing processing the second set of output values in the projection space.

35 Claims, 8 Drawing Sheets

(51) Int. Cl.
  *G06F 18/2451* (2023.01)
  *G06V 10/764* (2022.01)
  *G06V 10/77* (2022.01)
  *G06V 10/82* (2022.01)
  *G06V 20/00* (2022.01)
(52) U.S. Cl.
  CPC .......... *G06T 11/003* (2013.01); *G06V 10/764* (2022.01); *G06V 10/7715* (2022.01); *G06V 10/82* (2022.01); *G06V 20/35* (2022.01)

(56) References Cited

U.S. PATENT DOCUMENTS

2019/0373186 A1* 12/2019 Ortiz Egea .......... G06V 10/147
2020/0251089 A1*  8/2020 Pinto ................... A63F 13/54
2022/0114836 A1*  4/2022 Kim .................... G06N 3/084

FOREIGN PATENT DOCUMENTS

CN        110954734 B  *  3/2022  ............. G01R 19/00
WO     WO-2019032588 A1 *  2/2019  ............. G01B 21/16

OTHER PUBLICATIONS

Vinyals et al., Matching Networks for One Shot Learning, Advances in Neural Information Processing Systems, pp. 3630-3638, (Year: 2016).*
Yoon et al., "Meta Learner with Linear Nulling," Cornell University, arXiv:1806.01010 [cs.LG], Jun. 4, 2018 (10 pages).
Yoon et al., "Meta-Learner with Linear Nulling," Workshop on Meta-Learning (MetaLearn 2018), Dec. 8, 2018 (7 pages).
Yoon et al., "TapNet: Neural Network Augmented with Task-Adaptive Projection for Few-Shot Learning," 36th International Conference on Machine Learning 2019, Jan. 19, 2019 (11 pages).
Yoon et al., "TapNet: Neural Network Augmented with Task-Adaptive Projection for Meta Learning," KAIST School of Electrical Engineering, NAVER, Feb. 11, 2019 (50 pages).a
J. Snell et al., "Prototypical Networks for Few-shot Learning," Neural Information Processing Systems, 2017, pp. 4080-4090.
Office Action dated Aug. 20, 2020 in related Korean Appl. 10-2019-0051364 (10 pgs.).

* cited by examiner

[fig 1]
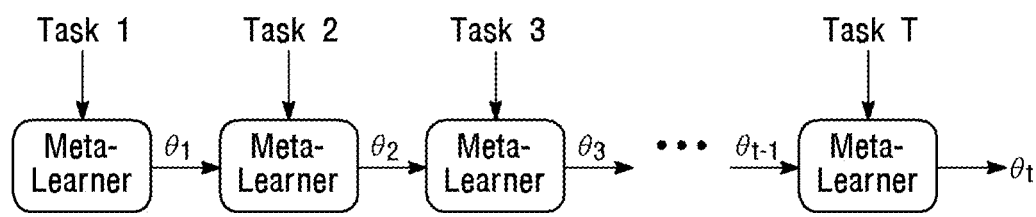
[fig 2]
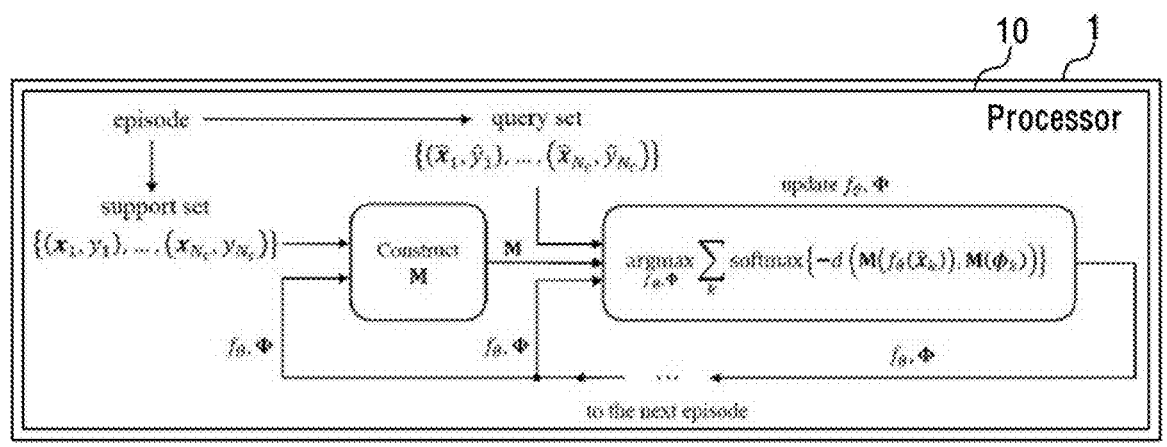

[fig 3]
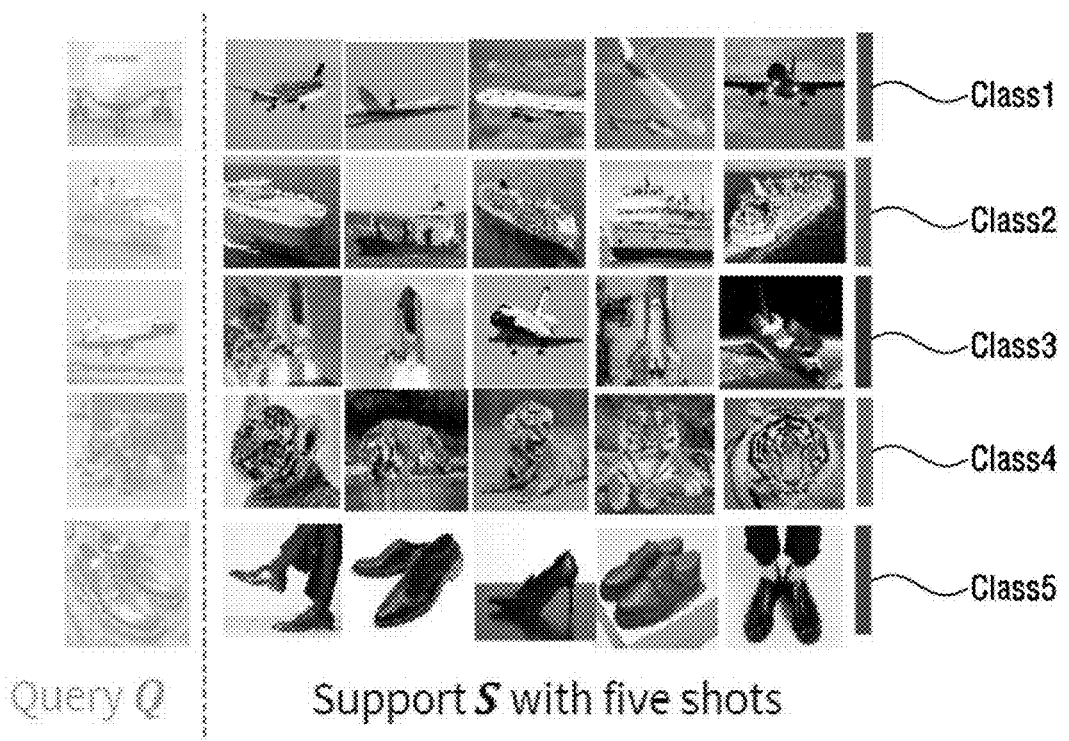

[fig 4a]
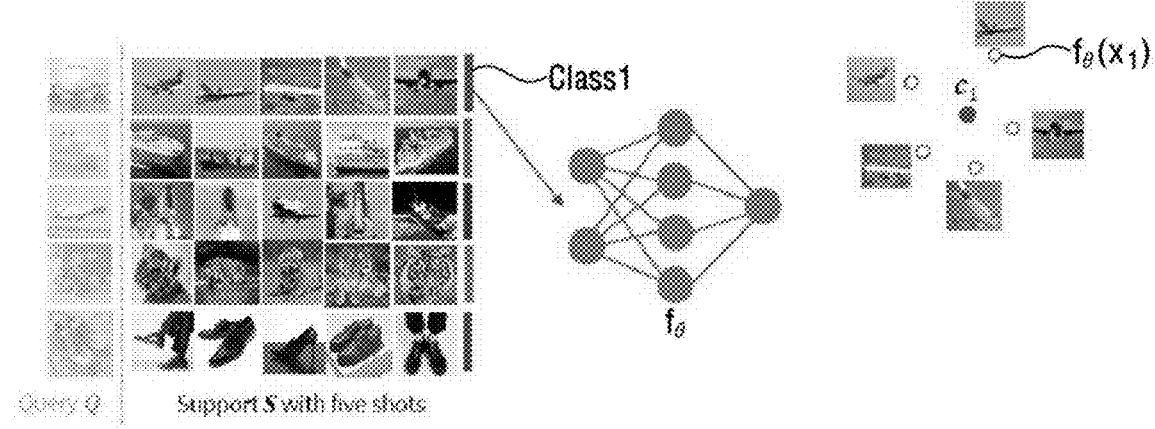
[fig 4b]
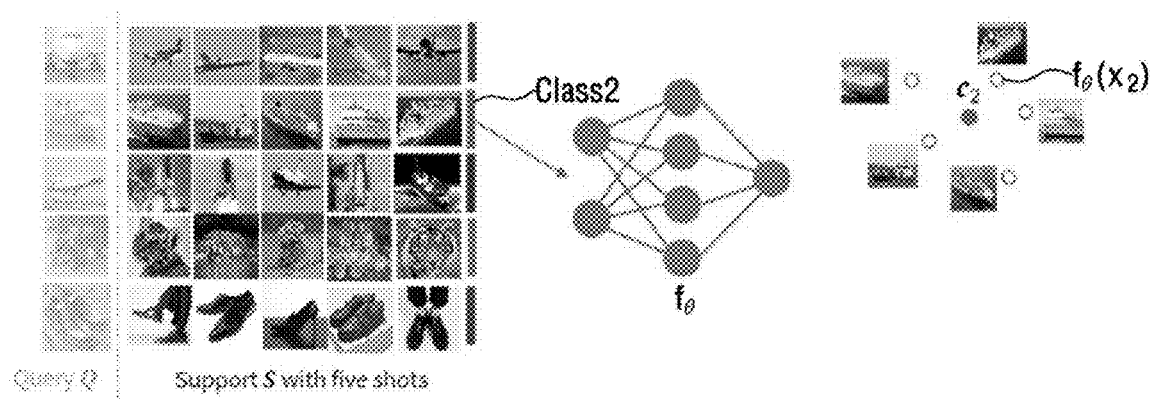
[fig 4c]
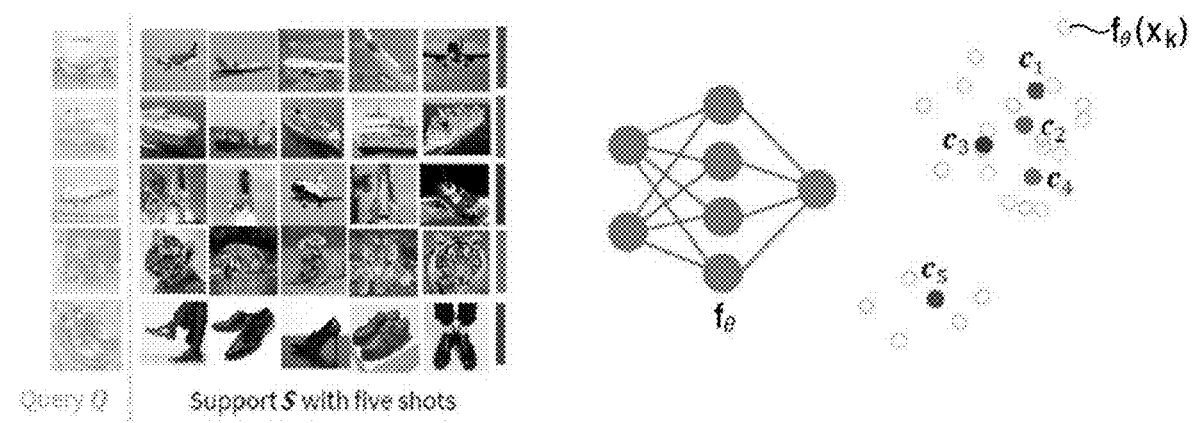

[fig 4d]
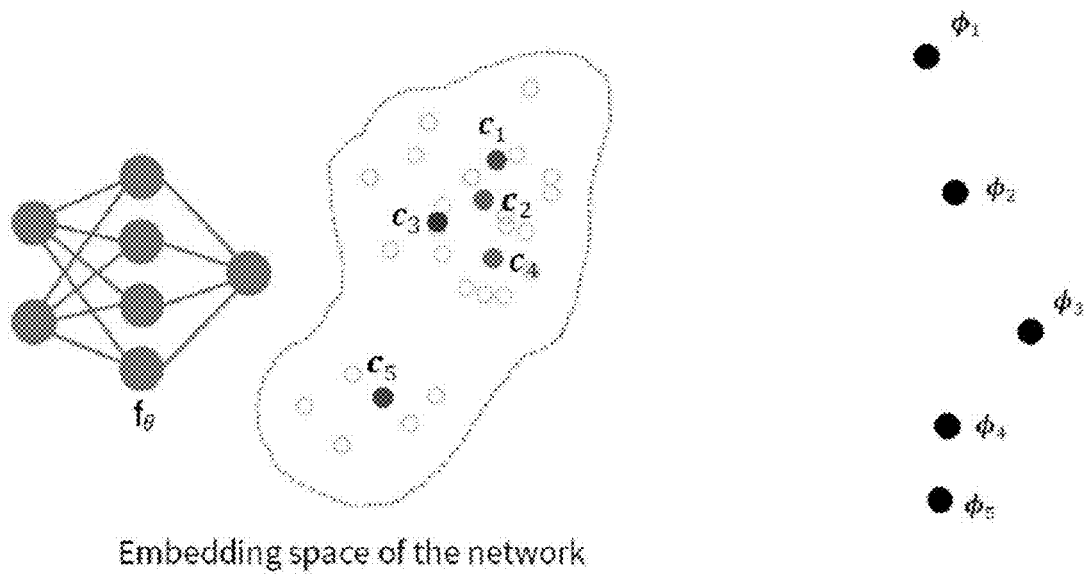
Embedding space of the network
[fig 4e]
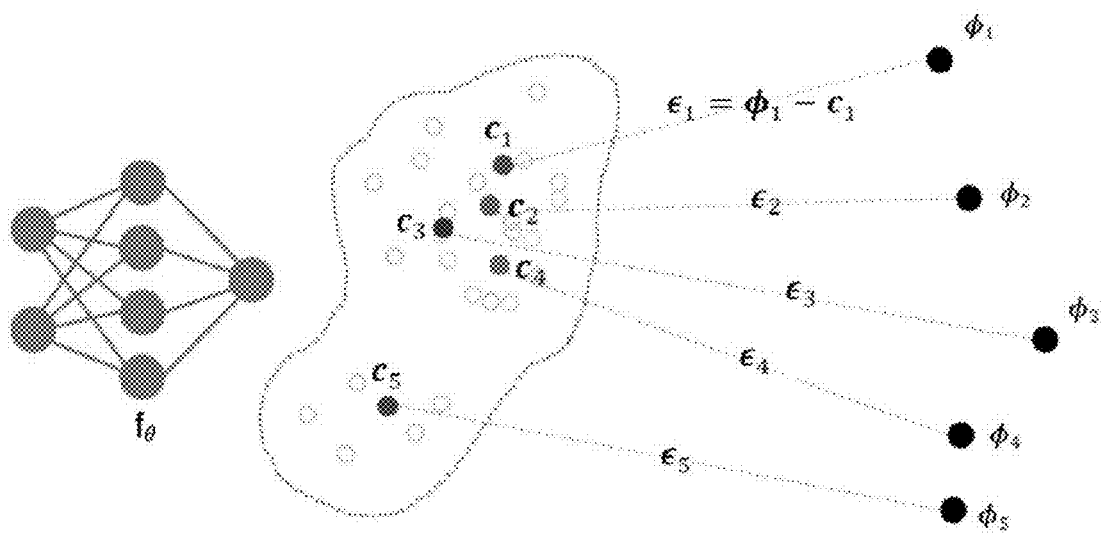
Embedding space of the network

[fig 4f]
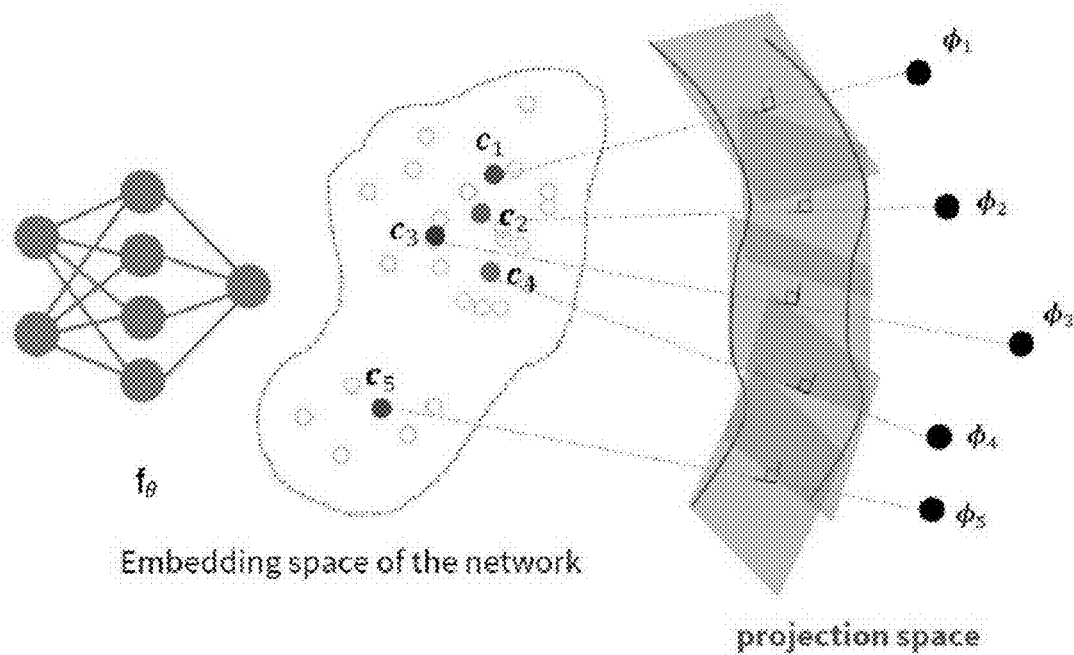

[fig 5a]
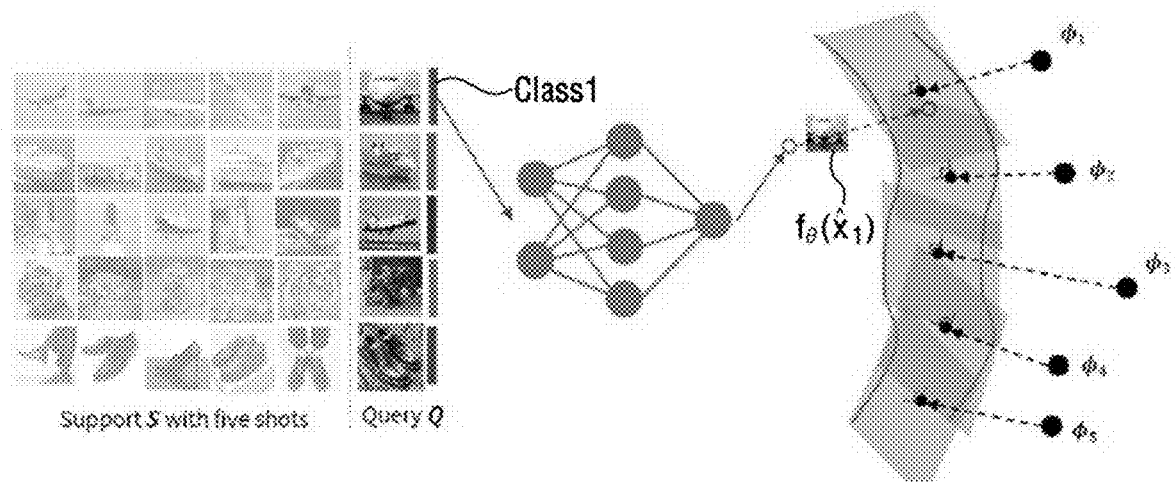
[fig 5b]
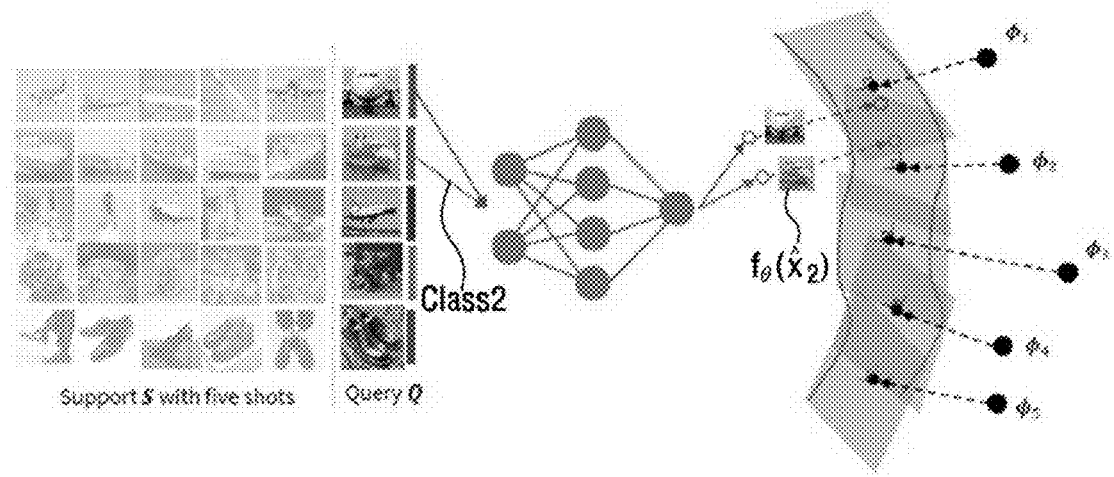

[fig 5c]

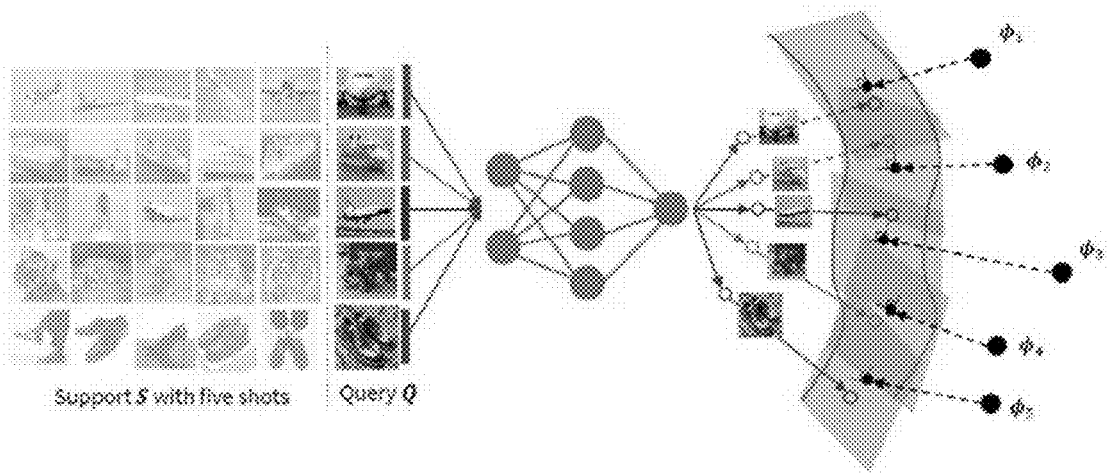

[fig 6]

Table 1. Few-shot classification accuracies for 20-way Omniglot and 5-way miniImageNet

| Methods | 20-way Omniglot | | 5-way miniImageNet | |
|---|---|---|---|---|
| | 1-shot | 5-shot | 1-shot | 5-shot |
| Matching Nets (Vinyals et al., 2016) | 88.2% | 97.0% | 43.56 ± 0.84% | 55.31 ± 0.73% |
| MAML (Finn et al., 2017) | 95.8% | 98.9% | 48.70 ± 1.84% | 63.15 ± 0.91% |
| Prototypical Nets (Snell et al., 2017) | 96.0% | 98.9% | 49.42 ± 0.78% | 68.20 ± 0.66% |
| SNAIL (Mishra et al., 2017) | 97.64 | 99.36 | 55.71 ± 0.99% | 68.88 ± 0.92% |
| adaResNet (Munkhdalai et al., 2018) | 96.12% | 98.48% | 56.88 ± 0.62% | 71.94 ± 0.57% |
| Transductive Propagation Nets (Liu et al., 2018) | - | - | 55.51 % | 69.86% |
| TADAM-$\alpha$ (Oreshkin et al., 2018) | - | - | 56.8 ± 0.3% | 75.7 ± 0.2% |
| TADAM-TC (Oreshkin et al., 2018) | - | - | 58.5 ± 0.3% | 76.7 ± 0.3% |
| TapNet (Ours) | 98.07% | 99.49% | 61.65 ± 0.15% | 76.36 ± 0.10% |

Table 2. Few-shot classification accuracies for 5-way tieredImageNet

| Methods | 5-way tieredImageNet | |
|---|---|---|
| | 1-shot | 5-shot |
| MAML (as evaluated in (Liu et al., 2018)) | 51.67 ± 1.81% | 70.30 ± 1.75% |
| Prototypical Nets (as evaluated in (Liu et al., 2018)) | 53.31 ± 0.89% | 72.69 ± 0.74% |
| Relation Nets (as evaluated in (Liu et al., 2018)) | 54.48 ± 0.93% | 71.31 ± 0.78% |
| Transductive Propagation Nets (Liu et al., 2018) | 59.91% | 73.30% |
| TapNet (Ours) | 63.08 ± 0.15% | 80.26 ± 0.12% |

[fig 7]
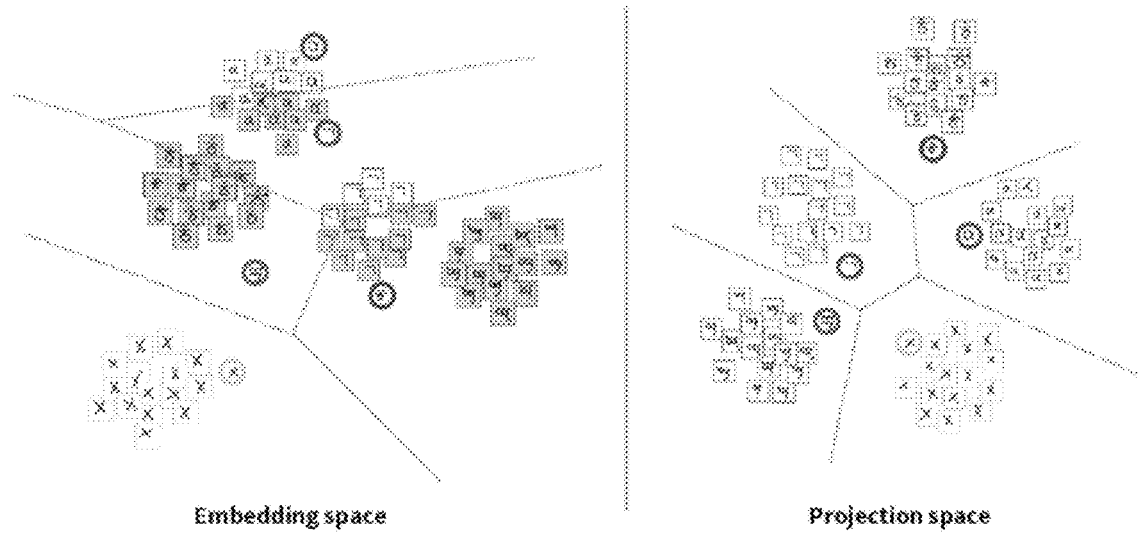
Embedding spaceProjection space
[fig 8]

DATA PROCESSING APPARATUS BY LEARNING OF NEURAL NETWORK, DATA PROCESSING METHOD BY LEARNING OF NEURAL NETWORK, AND RECORDING MEDIUM RECORDING THE DATA PROCESSING METHOD

BACKGROUND

Field

The present disclosure relates to a data processing apparatus by learning of a neural network, a data processing method by the learning of a neural network, and a recording medium recording the data processing method, and more particularly to a data processing apparatus by learning of a neural network, a data processing method by the learning of a neural network, and a recording medium recording the data processing method, which are for improving a processing performance by processing target data which has not yet been processed through a neural network through the use of a predetermined projection space formed from data processed through the corresponding neural network.

Description of the Related Art

An artificial intelligence system is a computer system which creates human-level intelligence. In the artificial intelligence system, the machine learns and judges for itself, and the more the machine is used, the more the recognition rate increases. An artificial intelligence technology is composed of a machine learning (deep learning) technology using an algorithm that classifies/learns itself the characteristics of input data and element technologies that simulate the functions of human brain such as recognition, judgment, etc., by using the machine learning algorithm. The element technologies may include, for example, at least one of a linguistic understanding technology, a visual understanding technology, an inference/prediction technology, a knowledge representation technology, and a motion control technology. The linguistic understanding technology is for recognizing human language/characters. The visual understanding technology is for recognizing an object like human vision recognizes the object. The inference/prediction technology is for determining information and for logically inferring and predicting. The knowledge representation technology is for processing human experience information as knowledge data. The motion control technology is for controlling the autonomous driving of a vehicle and the motion of a robot. In particular, the visual understanding technology is for recognizing and processing an object like human vision recognizes and processes the object. The visual understanding technology includes object recognition, object tracking, image search, human recognition, scene understanding, spatial understanding, image enhancement, etc.

Meanwhile, load occurs in the processing system, because learning of a neural network should be basically made quickly for a large amount of input data under the limited conditions. Additionally, depending on the complexity allowed in the neural network, the precision of the neural network connection weight is limited. Hereby, there is a disadvantage that the neural network weight does not have a full-precision value and is represented in a quantized form. In this case, the inference of the neural network is significantly reduced.

SUMMARY

One embodiment is a data processing method by learning of a neural network. The data processing method includes: obtaining a first set of output values by processing a first set of input values of a task by the neural network; forming a projection space on the basis of the first set of output values; obtaining a second set of output values by processing a second set of input values out of input values of the task by the neural network; projecting the second set of output values onto the projection space; and performing processing the second set of output values in the projection space.

The forming a projection space may be performed by linear processing.

The projecting the output value of the neural network onto the projection space may be performed by linear processing.

The projection space may be formed based on the first set of output values of the neural network and a reference vector set, and the reference vector set may be composed of one or a plurality of reference vectors and may be learned together with the neural network.

The processing may be performed in the projection space by using both a first set of result values obtained by projecting the second set of output values of the neural network onto the projection space and a second set of result values obtained by projecting the reference vector set onto the projection space.

The projection space may be formed without using a gradient descent algorithm.

The neural network may be a recurrent neural network (RNN) or a convolutional neural network (CNN).

The first set of input values may be a support set and the second set of input values is a query set. The support set may include a selected part of the input values of the task and label information on the corresponding selected part of the input values, and the query set may include another selected part of the input values of the task other than the support set and label information on the corresponding another selected part of the input values.

In the processing, on the basis of the second set of output values obtained after processing the query set through the neural network, the query set may be classified in the projection space formed by using the first set of output values obtained after processing the support set through the neural network.

The query set may be classified in the projection space by using both a first set of result values obtained by projecting the second set of output values obtained by processing the query set through the neural network onto the projection space and a second set of result values obtained by projecting reference vectors within a reference vector set onto the projection space. The reference vector set may be composed of one or a plurality of the reference vectors and may be learned together with the neural network.

The query set may be classified in the projection space by using distance values which are obtainable for a plurality of pairs between the first set of result values and the second set of result values. The neural network and the reference vector set may be updatable by using a loss based on the distance values obtained for all data within the query set.

Each query data in the query set may be classified in the projection space on the basis of the second predetermined result value having a distance value closest to the first result value corresponding to the query data.

The projection space may be a space for per-class mean vectors obtained from the first set of output values included in an output space of the neural network and the reference vector set corresponding to the per-class mean vectors are arranged close to each other. The per-class mean vectors may correspond to average values according to each class of the first set of output values obtained by processing the support set through the neural network.

The projection space may be formed by using error vectors which are differences between per-class mean vectors and the corresponding reference vectors.

The projection space may be formed such that the error vector is 0 (null) for all classes in the projection space.

The projection space may be formed without using a gradient descent algorithm.

The neural network may be a recurrent neural network (RNN) or a convolutional neural network (CNN).

Another embodiment is a data processing apparatus by learning of a neural network, the data processing apparatus including a processor which is implemented to execute an instruction readable by the data processing apparatus. The processor obtains a first set of output values by processing a first set of input values of a task by the neural network, forms a projection space on the basis of the first set of output values, processes a second set of input values out of input values of the task by the neural network, projects the second set of output values onto the projection space, and performs processing the second set of output values in the projection space.

The forming a projection space may be performed by linear processing.

The projecting the output value of the neural network onto the projection space may be performed by linear processing by the processor.

The projection space may be formed based on the first set of output values of the neural network and a reference vector set by the processor. The reference vector set may be composed of one or a plurality of reference vectors and may be learned together with the neural network.

The processing may be performed in the projection space by the processor by using both a first set of result values obtained by projecting the second set of output values of the neural network onto the projection space and a second set of result values obtained by projecting the reference vector set onto the projection space.

The projection space may be formed by the processor without using a gradient descent algorithm.

The neural network may be a recurrent neural network (RNN) or a convolutional neural network (CNN).

The first set of input values may be a support set and the second set of input values may be a query set. The support set may include a selected part of the input values of the task and label information on the corresponding selected part of the input values, and the query set may include another selected part of the input values of the task other than the support set and label information on the corresponding another selected part of the input values.

On the basis of the second set of output values obtained after processing the query set through the neural network, the processor may classify the query set in the projection space formed by using the first set of output values obtained after processing the support set through the neural network.

The processor may classify the query set in the projection space by using both a first set of result values obtained by projecting the second set of output values obtained by processing the query set through the neural network onto the projection space and a second set of result values obtained by projecting reference vectors within a reference vector set onto the projection space. The reference vector set may be composed of one or a plurality of the reference vectors and may be learned together with the neural network.

The processor may classify the query set in the projection space by using distance values which are obtainable for a plurality of pairs between the first set of result values and the second set of result values. The neural network and the reference vector set may be updatable by using a loss based on the distance values obtained for all data within the query set.

The processor may classify each query data in the query set in the projection space on the basis of the second predetermined result value having a distance value closest to the first result value corresponding to the query data.

The projection space may be a space for per-class mean vectors obtained from the first set of output values included in an output space of the neural network and the reference vector set corresponding to the per-class mean vectors are arranged close to each other. The per-class mean vectors may correspond to average values according to each class of the first set of output values obtained by processing the support set through the neural network.

The processor may form the projection space by using error vectors which are differences between the per-class mean vectors and the corresponding reference vectors.

The processor may form the projection space such that the error vector is 0 (null) for all classes in the projection space.

The neural network may be a recurrent neural network (RNN) or a convolutional neural network (CNN).

The query set may be classified through the projection onto the projection space without using a gradient descent algorithm.

Further another embodiment is a computer-readable medium for recording a computer program for performing the above-described methods.

BRIEF DESCRIPTION OF THE DRAWINGS

FIG. 1 is a view showing a learning process for learning a meta-learner according an embodiment of the present invention;

FIG. 2 is a view showing a data classification method by learning of a neural network of a data classification device 1 by the learning of a neural network according to the embodiment of the present invention;

FIG. 3 is a view referred to for describing a support set and a query set of the embodiment of the present invention;

FIGS. 4a to 4f are views referred to for describing a method of forming a projection space according to the embodiment of the present invention;

FIGS. 5a to 5c are views referred to for describing a process of classifying the query set in the projection space according to the embodiment of the present invention;

FIG. 6 shows experimental data relating to the result of data classification accuracy according to the embodiment of the present invention;

FIG. 7 shows that the projection space and a neural network embedding space of TapNet which has learned by Omniglot data set according to the present invention are schematized by using t-SNE; and FIG. 8 shows schematically an algorithm according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

In the situation where the inference of the neural network is not sufficient, the embodiment of the present invention can be widely applied to tasks that can overcome the situation through a neural network-signal processing module combined structure and its learning algorithm. The tasks include specifically the following situations: 1) For an unlearned task, a situation where the inference must be obtained quickly and successfully only by very little amount of data of the task, and 2) In the situation where the size of the neural network and the precision of the connection weight of the neural network are limited due to hardware or software problems, the successful inference must be obtained.

In relation to the above 1), the embodiment of the present invention relates to meta-learning. The meta-learning can be defined as a learning paradigm for preparing in advance a task that has never been learned and is processed in the future, when the task to be learned is not fixed. Therefore, the meta-learning is a 'learn-to-learn' process, which means 'learning for learning'. For a fixed task, if an existing learning learns a strategy specific to the task, the meta-learning according to the embodiment of the present invention has to learn a strategy for obtaining a successful inference for a new task which has never been learned. In other words, the meta-learning can be referred to as a paradigm for learning common inference strategies which are shared by the changing tasks.

As described above, how quickly it responds to the task and obtains successful inferences only by a very small amount of samples of a new task which has never been learned is a criterion for evaluating the performance of the meta-learning according to the embodiment of the present invention. Thus, the key strategy of a meta-learner lies in the design of an algorithm which can quickly adapt to a given current task and obtain successful inferences while learning common strategies which are shared by the changing tasks.

FIG. 1 is a view showing a learning process for learning the meta-learner according an embodiment of the present invention. A meta-learning algorithm of FIG. 1 learns shared knowledge about the changing tasks in the form of a parameter $\theta_t$ of the neural network.

In the embodiment of the present invention, a signal processing module combined with the neural network can be optimized immediately even by only a small amount of samples of a new task, and the optimized signal processing module receives a signal of the neural network and performs a 'task-adaptive processing' to obtain a significantly improved inference.

In relation to the above 2), the issue of the size of the neural network and the precision of the connection weight is also a problem that can be solved by the embodiment of the present invention. The size of the neural network and the precision of the connection weight are one of the biggest factors in the complexity of both hardware and software. The larger the size of the neural network, the more the connection weight to learn, and computational and memory complexity required for learning are greatly increased. If the size of the neural network is small, the complexity is greatly reduced. However, the strategies which can be learned through the neural network are limited and the performance is significantly degraded. The precision of the connection weight of the neural networks is an issue of the accuracy of the values of weights that need to be learned. Most neural network learning researches are directed without any complexity limit of the connection weight, and in this case, a floating point or full-precision is applied to the weight. However, in this case, many memory complexities are required to represent the weight, and this fine weight value has to be optimized through learning. Accordingly, the computational complexity is also increased. When a low precision of the weight should be used due to the complexity limit, the inference performance of the neural network is significantly degraded.

The embodiment of the present invention can be used to obtain the successful inference performance of the neural network under a limited situation where a low complexity neural network is required. Specifically, when the inference of the neural network is not accurate due to the complexity limit, the embodiment of the present invention can be used to improve the inference by processing the signal of the neural network through the signal processing module.

The embodiment of the present invention deals with a combined system of the neural network and the signal processing module receiving the signal of the neural network. Specifically, an output signal, a hidden layer signal, or a feature of an output layer of the neural network is received as an input of the signal processing module and is processed.

The additional processing of the signal processing module of the embodiment of the present invention greatly improves the insufficient inference of the neural network. The embodiment of the present invention is not limited by the structure and form of the neural network and contains a detailed design strategy of the signal processing module. Based on the combined system and the learning algorithm, it is possible to achieve greatly improved inference performance in a learning situation that is actually difficult to deal with only by the learning of the neural network.

The detailed description of the neural network-signal processing module combined system and the process of the proposed learning algorithm will be described in detail. In the embodiment of the present invention, the neural network-signal processing module combined system is defined as a term of TapNet (Task Adaptive Projection Network, hereinafter abbreviated as TapNet). Also, in the embodiment of the present invention, the In addition, the signal processing module in the embodiment of the present invention can be defined as a concept including a projection space formed by using a neural network output result and a module for classifying data by using the projection space. Specifically, a detailed description will be given by assuming that a linear operation is performed in which an input vector is multiplied by a specific matrix in the projection space and a distance metric is calculated based on the obtained vector. A form of multiplying an input vector signal by a matrix may be interpreted as a process of projecting the input vector onto a projection space formed by the matrix. In the following description, a corresponding space projection operation will be referred to as 'Task-Adaptive Projection'.

Specifically, since, for a new task, very many connection weights of the neural network cannot be newly learned, the signal processing module is optimized based on the signal of the neural network for a small number of samples. The signal processing module is optimized to enable a successful inference in the current task, and such design and optimization are based on mathematical analysis. In addition, unlike neural network optimization based on many samples, the optimization of the signal processing module can immediately obtain an optimized signal processing module. Based on the signal processing module that can be designed immediately or very easily, the inference of a new task can be significantly improved without relearning the neural network. This may be referred to as 'task-adaptive processing' in that it improves the inference of the neural network on the basis of the signal processing module suitable for a new task.

Hereinafter, a data classification method by the learning of a neural network of a data classification device 1 by the learning of a neural network according to the embodiment of the present invention will be described with reference to FIG. 2.

The data classification device 1 by the learning of a neural network according to the embodiment of the present invention may include a processor 10 which is implemented to execute instructions readable by the data classification device.

As shown in FIG. 2, data classification through the learning of a neural network according to the embodiment of the present invention may be performed by using an embedding network neural network $f_\theta$, a reference vector $\Phi$ according to class, and a linear processing module M which maps the features of the embedding network to new classification spaces through the task-adaptive projections. In the embodiment of the present invention, the embedding network neural network $f_\theta$ may be a recurrent neural network (RNN) or a convolutional neural network (CNN). However, this is merely an example and the scope of the present invention is not limited thereto.

Although the data classification according to the embodiment of the present invention has been shown based on an image classification task, the scope of the present invention is not limited thereto.

The reference vector $\Phi$ is formed in the form of a matrix such as $\Phi=[\phi_1; \ldots ; \phi_{N_c}]$ which has $\phi_k$, i.e., a reference row vector of a class k, as a k-th row. M means a linear processing module which performs projection or mapping of features, or may means the projection space itself in some cases. FIG. 2 is a view showing a process of learning one episode in the learning process of consecutive episodes. One episode may include a support set, $S_k$ and a query set $Q_k$, which are formed through a combination of an image data and a label indicating the corresponding image data. For example, referring to FIGS. 2 and 3, the support set and the query set may be composed of one image data/label pair per class (class 1 to class 5) such as $\{(x_1,y_1), \ldots, (x_{N_c},y_{N_c})\}$ and $\{(\hat{x}_1,\hat{y}_1), \ldots, (\hat{x}_{N_c},\hat{y}_{N_c})\}$.

Specifically, the support set is a data/label pair which is processed through the neural network, and the neural network output of the support set is used to form the projection space. The query set is the remaining data/label pair other than the support set in the episode and is classified in the projection space.

However, although the image data has been described in the embodiment of the present invention, the episode may be composed of text data in accordance with the embodiment. The processor 10 of the embodiment of the present invention may form the projection space by using the support set and may classify the query set through the neural network and the reference vectors which are learned together with the neural network in the formed projection space. As a result, the task-adaptive learning is performed by projecting a neural network output value of the support set in which the data/label pair is predefined onto the projection space, thereby performing the classification of the query set which has not been classified yet, even without using a gradient descent algorithm processing method. For reference, the gradient descent algorithm processing method is one of function optimization techniques. The gradient descent algorithm processing method is to optimize a function by repeatedly adjusting a parameter of the function by using the slope of a loss function in a direction in which a defect value is reduced. Also, in the field of machine learning, the gradient descent algorithm processing method is used to learn the weight of the neural network or values to be learned. Learning of a neural network through the gradient based algorithm learning usually requires a very large amount of input data. On the other hand, in the embodiment of the present invention, it is possible to classify the query set which has not been classified yet, even without using the gradient descent algorithm processing method, thereby reducing the computational complexity.

When a new support set is given, the embedding network neural network $f_\theta$ and the reference vectors $\Phi$ are fixed in a learned form through the previous episodes. The processor 10 may form the projection space M by using the support set, the embedding network neural network $f_\theta$, and the reference vector $\Phi$ such that embedding feature vectors $f_\theta(x_k)$ and the reference vectors $\phi_k$ of the corresponding class are arranged adaptively with each other. A specific method of forming the projection space will be described below in detail with reference to FIG. 4. The processor 10 may perform a process of classifying the query set by projecting a neural network output signal of the query set in the formed projection space.

This will be described with reference to FIGS. 2 and 5. Specifically, the processor 10 performs the classification of the query set in the projection space by using both a first set of result values obtained by projecting a feature vector $f_\theta(\hat{x}_k)$ of a query, that is, the neural network output signal of the query set, onto the projection space and a second set of result values obtained by projecting the reference vector $\phi_k$ onto the projection space.

For example, as shown in FIG. 5a, $f_\theta(\hat{x}1)$, i.e., a result obtained by outputting a class 1 of the query set through the neural network may be projected onto the projection space, and at the same time, $\overline{\phi_1}$ may be projected onto the same projection space.

Also, as shown in FIG. 5b, $f_\theta(\hat{x}2)$, i.e., a result obtained by outputting a class 2 of the query set through the neural network may be projected onto the projection space, and at the same time, $\overline{\phi_2}$ may be projected onto the same projection space.

This process is repeatedly performed for all classes of the query set, so that the result shown in FIG. 5c can be output.

Here, the embedding network neural network $f_\theta$ and the reference vectors $\Phi$ may be updated in the process of repeatedly performing the classification of the episodes. For example, the embedding network neural network $f_\theta$ and the reference vectors $\Phi$ may be updated through softmax loss by using Euclidean distance which is a distance difference between the feature vector $f_\theta(\hat{x}_k)$ of the query and the reference vector $\phi_k$. That is, the neural network and the reference vector are updated in the process of performing the classification in the projection space on the basis of the feature vector $f_\theta(\hat{x}_k)$ of the query and the reference vector which is the closest to the feature vector $f_\theta(\hat{x}_k)$ of the query.

$$softmax\{-d(M(f_0(\hat{x}_k)), M(\phi_k))\} = \frac{\exp\{-d(M(f_0(\hat{x}_k)), M(\phi_k))\}}{\sum_{k'}\exp\{-d(M(f_0(\hat{x}_k)), M(\phi_{k'}))\}} \quad \text{Equation (1)}$$

The softmax value of the distance difference may be represented as shown in Equation (1), and a defect value (loss) which can be obtained based on the softmax value may be obtained for the entire query set and averaged, and used for learning. In Equation (1), M(z) means a result of projecting a row vector z into the projection space M. All the vectors including the embedding feature vector $f_\theta(x_k)$ are assumed to be in the form of a row vector. The reference vectors Φ and the embedding network neural network $f_\theta$ updated with the defect value (Loss) are transmitted to the next episode learning step, and the formation of the projection space and the update of the parameter are repeated until all the learning episodes are used.

In summary, the embedding network neural network $f_\theta$ and the reference vectors Φ are learned at a low rate through various episodes or tasks, and the projection space M is formed in a form suitable for a particular task and quickly provides conditioning for the task. The combination of these elements which are learned at different rates has an ability to adapt well to a new classification task. This can be verified through various experimental results.

Hereinafter, a method of forming the projection space according to the embodiment of the present invention will be described with reference to FIGS. 2 and 4.

In the embodiment of the present invention, the projection space may be defined as a new space which is different from the embedding space formed by using the embedding feature vector $f_\theta(x_k)$, i.e., which is the neural network output result. The new space is formed by using the reference vector Φ and a per-class mean vector $c_k$ of the embedding feature vectors $f_\theta(x_k)$. That is, the projection space may be defined as a new space which is different from the embedding space formed primarily by using the neural network output result and is formed secondarily by using the embedding space and the neural network output result.

Also, the projection space may be a linear processing module formed based on the neural network output result.

The mapping function or the process of forming the projection space M is based on eliminating misalignment between the embedding feature vectors $f_\theta(x_k)$ of the task and the reference vector Φ. In the embodiment of the present invention, the task is defined as another expression of the episode in a training process. In order to include a general case of using a plurality of images for each class, the per-class mean vector of the embedding feature vectors $f_\theta(x_k)$ in which the images of the class k included in the support set is processed by the neural network can be represented as $c_k$.

The projection space according to the embodiment of the present invention may be, as described in FIG. 2, formed by using the support set, the embedding network neural network $f_\theta$, and the reference vectors Φ.

First, the processor 10 may, as shown in FIGS. 4a to 4c, extract the embedding feature vector $f_\theta(x_k)$ and the per-class mean vector $c_k$ of the embedding feature vectors $f_\theta(x_k)$ for each class by using the support set and the embedding network neural network $f_\theta$. As shown in FIG. 4a, $f_\theta(x1)$, i.e., the results of performing learning through the embedding network neural network $f_\theta$ of each of the images included in the class 1 of the support set may be obtained together with the per-class mean vector c1 of the results. As shown in FIG. 4b, $f_\theta(x2)$, i.e., the results of performing learning through the embedding network neural network $f_\theta$ of each of the images included in the class 2 of the support set may be obtained together with the per-class mean vector c2 of the results. By repeating this process for all classes included in the support set, the respective embedding feature vectors $f_\theta(x_k)$ corresponding to all classes (class 1 to class 5) and the per-class mean vectors $c_k$ (c1 to c5) of the same can be, as shown in FIG. 4c, obtained.

The processor 10 may, as shown in FIGS. 4d to 4f, form the projection space such that an error vector $\epsilon_k$ which is a difference between the respective reference vectors 4 corresponding to the respective per-class mean vectors $c_k$ is 0 (null). Specifically, for accurate classification in the projection space, the projection space M is formed where the per-class mean vector $c_k$ and the reference vector $\phi_k$ are arranged close to each other. According to the embodiment, in the projection space, the per-class mean vectors $c_k$ and reference vectors $\phi_k$ corresponding to the respective per-class mean vectors $c_k$ respectively may be arranged close to each other. Simultaneously with this, more accurate classification can be performed when the per-class mean vector $c_k$ and other reference vectors $\phi_{l \neq k}$ corresponding to other classes are well separated in the projection space. This projection space can be efficiently formed by simple linear processing rather than learning.

Referring to FIGS. 4e and 4f, the processor 10 may form the projection space where the per-class mean vector $c_k$ and the modified reference vector $\bar{\phi}_k$ are arranged, by using the following equations 2 and 3.

$$\tilde{\phi}_k = \phi_k - \frac{1}{N_c - 1}\sum_{l \neq k}\phi_l \quad \text{Equation (2)}$$

$$\epsilon_k = \frac{\tilde{\phi}_k}{\|\tilde{\phi}_k\|} - \frac{c_k}{\|c_k\|} \quad \text{Equation (3)}$$

For reference, Nc in Equation (2) represents the number of classes.

That is, by using the error vector $\epsilon_k$ extracted by subtracting the per-class mean vector $c_k$ from the modified reference vector $\bar{\phi}_k$ defined by Equation (3), it means that the projection space M is formed such that the projected error vector $\epsilon_k M$ is 0 for each class k. Here, the projection space M means a matrix in which each column spans to form a projection space. This means that the projection space M is formed by nulling the error vectors $\epsilon_k$. For example, a matrix M may be represented by $M = null_D([\epsilon_1; \ldots ; \epsilon_{N_c}])$, where D is the column dimension of M. In the embodiment of the present invention, by using singular value decomposition (SVD) of the matrix $[\epsilon_1; \ldots ; \epsilon_{N_c}]$ of error vectors, the projection space may be formed by selecting D number of the vectors from the right singular vectors of the matrix from $N_c+1$ to $N_c+D$. When L, i.e., the length of the error vector, is larger than $N_c$, i.e., the number of classes and D is smaller than $L-N_c$, the D dimensional projection space M described above always exists.

Here, the dimension D of the projection space may be set to be less than $L-N_c$, thereby reducing the dimension of the projection space. Experiments have shown that, in some specific cases, this reduction of dimension improves the accuracy of few-shot classification. In terms of computational complexity, the complexity of the singular value decomposition of a matrix of size (n×m) (n≤m) is $O(mn^2)$. Therefore, the computational complexity required for forming the projection space of the embodiment of the present invention may be $O(LN_n^2)$ which is relatively less than the complexity of a general model.

In addition, since the combination between the reference vector and the per-class mean vector of the neural network is made in a new projection space, the reference vectors $\phi_k$ do not have to be labeled differently according to the change of the episode, and the episode learning can be performed with a fixed label attached to each reference vector.

Hereinafter, the relation between TapNet of the embodiment of the present invention and a memory-augmented neural network will be described.

The TapNet of the embodiment of the present invention is a distance-based meta-learning algorithm similar to a matching network or a prototypical network, and further it has a similarity to a memory-augmented neural network algorithm which quickly adapts to a new task by using a prior external memory (not shown). An external memory $M_c$ of the memory-augmented neural network has a form of a matrix storing information on the episodes obtained from a controller. The read result vector r of the memory $M_c$ consists of a linear combination of the columns of the external memory such as $r \leftarrow \Sigma_i w_i^r m_i$. Here, a read weight $w_i^r$ is proportional to a cosine similarity between the i-th column of the external memory and the output of a controller neural network or a key vector k, as shown in the following Equation (4).

$$w_i^r \leftarrow \frac{\exp(K(k, m_i))}{\sum_{j \neq i} \exp(K(k, m(j)))} \quad \text{Equation (4)}$$

Here, when the exponential function is approximated to a linear function such as $\exp(K(k,m_i)) \approx 1+K(k,m_i)$ and the constants irrelevant to the class are omitted, the vector of the reading weight may be approximated to $w^r \sim M_c^T k^r$, and the reading result vector may be approximated to $r \sim M_c M_c' k^r$. In the final classification process, a memory read result vector is multiplied by the matrix $W=[w_1; \ldots; W_{N_c}]$ of weights according to classes, and a value obtained by the multiplication is used for classification. The result at this point of time may be approximated to $WM_c M_c' k^r$.

The memory-augmented neural network uses an output of a long short-term memory (LSTM) which is used as the controller neural network in the inference process. However, when focusing on inference results from the memory read result vector using information in memory, it can be seen that the memory-augmented neural network makes inference based on the similarity between the weight matrix W and the memory read result r.

In the case of TapNet of the embodiment of the present invention, if the cosine similarity is used instead of Euclidean distance, the distance between the query data and the reference weight may be represented as $\Phi MM'(f_\theta(x))^r$. This is similar to the similarity between the matrix W of the memory-augmented neural network and the memory read result r. Here, the matrix W of the memory-augmented neural network functions as the matrix $\Phi$ of TapNet and the key vector k of the memory-augmented neural network functions as the output of the embedding neural network of TapNet. Interestingly, it can be found that, through such similarity, the external memory $M_c$ of the memory-augmented neural network serves as a kind of the projection space suitable for a task, and the memory-augmented neural network performs the inference on the basis of the similarity between the neural network output k of the query data and the weight W on the projection space.

Hereinafter, an algorithm according to the embodiment of the present invention will be described with reference to FIG. 8.

The embedding neural network $f_\theta$ of TapNet and reference vector $\Phi$ are learned through the episode learning. A specific learning method is shown in FIG. 8.

Each learning episode may be created by randomly selecting $N_c$ number of classes from a training data set. In the processor 10, for each class in the episode, $N_c$ number of labeled random samples constitute the support set $S_k$ and $N_c$, number of the samples constitute the query set $Q_k$. Here, the query set and the support set are configured such that they do not overlap. From the support set $S_k$, the per-class mean vector $c_k$ is calculated for each class (Line 5 of the algorithm). By using average output vectors according to classes, an error vector is calculated for each class (Line 6 of the algorithm). Here, re-labeling of the reference vectors is not performed. The projection space M is obtained as a null space of these error vectors. Each query data is processed by the neural network and then projected onto the projection space M. The distance between the query data and the reference vectors in the projection space is measured by using Euclidean distance. The learning loss is calculated by using the distance between this query and the reference vector. The average learning loss is calculated as an average of the losses obtained from $N_q$ number of queries of $N_c$ number of classes the individual queries of the classes (Lines 11 to 14 of the algorithms). The processor 10 updates a parameter $\theta$ of the embedding neural network and the reference vector $\Phi$ by using the average learning loss. This episode learning process is repeated each time throughout the learning episode composed of new classes and queries.

Hereinafter, experimental results demonstrating the performance of the embodiment of the present invention will be described.

1. Example 1 of Experimental Data Set: Omniglot

Omniglot is a data set consisting of handwritten images of characters of various languages. This data set contains 1,623 types of characters contained in 50 kinds of languages, and one type of character consists of 20 images. In the experiment, a grayscale image which has been reduced to 28*28 size is used. Similarly to previous studies, a class-level data augmentation technique has been applied by the rotation of 90 degree units.

2. Example 2 of Experimental Data Set: miniImageNet miniImageNet is a data set proposed by Vinyal et al., and is a partial data set of ILSVRC-12 ImageNet. The miniImageNet consists of 100 classes of ImageNet data sets, and each class consists of 600 images. The data set is composed by a method proposed by Ravi and Larochelle. In the experiment, a color image which has been reduced to 84*84 size is used. The data set is divided into 64 training classes, 16 validation classes, and 20 test classes.

3. Example 3 of Experimental Data Set: tieredImageNet tieredImageNet is a data set proposed by Ren et al., and is a partial data set of ImageNet, which is larger than the miniImageNet. The tieredImageNet consists of 608 classes and 779,165 images in total. The classes of the tieredImageNet are classified into 34 upper categories in accordance with the similarity between classes, and 34 categories are divided into 20 training categories, 6 validation categories, and 8 test categories, respectively. The data set is hereby divided into 351 training classes, 97 validation classes, and 160 test classes. The tieredImageNet deals with more realistic classification situations than the miniImageNet because the tieredImageNet uses training and test data of different categories.

4. Experimental Settings of the Embodiment of the Present Invention

In all the experiments of the present invention, the performance was measured by using ResNet-12-structured neural network. ResNet-12 consists of four residual blocks, each of which consists of three 3×3 s and a convolution shortcut layer. The output of each convolution layer is connected to batch normalization and ReLU activation functions. The output of each block is reduced by 2×2 max pooling. The final output signal processed by all residual blocks is compressed again by global average pooling. The structure of the neural network is the same for all the experiments. However, the number of channels of the residual block is set differently for the three classification problems. In the miniImageNet and tieredImageNet experiments, the number of the channels starts from 64 and increases double every time Max pooling is applied. In the Omniglot experiment, as in other experiments, the number of the channels starts from 64 and increases every time Max pooling is applied. However, the number of the channels increases less than other experiments, and thus, a relatively small neural network is used.

For learning of a neural network, Adam optimization as well as optimized learning rate are used. In all the experiments, an initial learning rate is $10^{-8}$. In the Omniglot experiment, the learning rate is reduced by a half thereof for every 40,000 episodes. In the miniImageNet experiment, the learning rate is reduced to one tenth for every 20,000 episodes in 1 shot and for every 40,000 episodes in 5 shot. Also, in the tieredImageNet experiment, the learning rate is reduced to one tenth for every 40,000 episodes in 1 shot and for every 30,000 episodes in 5 shot.

In the meta-learning of the neural network, high way learning used in the previous study of Prototypical Network has been applied. In the 20-way Omniglot experiment, the episode composed of 60 classes is used in the learning, and in the 5-way miniImageNet and tieredImageNet experiments, the episode composed of 20 classes is used in the learning. The learning and the number of test classes are different. Therefore, during the test, 20 out of 60 reference vectors in the Omniglot experiment and 5 out of 20 reference vectors in the ImageNet experiment must be selected. During this process, a new label is attached to each class. For average neural network outputs for each class, the label of the class corresponding to the closest reference vector is attached. A distance between the average neural network output and the reference vector is measured by using Euclidean distance. After labeling the reference vector again, a new projection space M for Few-shot learning is obtained.

In the 20-way Omniglot classification experiment, learning is performed by using 100,000 learning episodes composed of 15 query images for each class. In the 5-way miniImageNet and 5-way tieredImageNet classification experiments, learning is performed by using 50,000 learning episodes composed of 8 query images for each class. In all the experiments, a model having the highest validation accuracy during the meta-learning process is stored and used for testing.

5. Performance Results of the Embodiment of the Present Invention

Table 1 and Table 2 shown in FIG. 6 show the result of the few-shot classification accuracy of the proposed TapNet meta-learning algorithm. The classification performance of prior arts such as Matching Network, MAML, Prototypical Network, TADAM, etc., and the classification performance of the embodiment of the present invention are compared by using Omniglot, miniImageNet, and tieredImageNet data sets. The classification performance of the Omniglot experiment is shown by the average accuracy measured by using 10,000 test episodes composed of 5 queries per class. The classification performance of the miniImageNet and tieredImageNet experiments is shown by 95% confidence interval and the average accuracy measured by using 30,000 test episodes composed of 15 queries per class.

In the 20-way Omniglot classification in Table 1, TapNet shows the best performance in both 1-shot and 5-shot classifications. In the 5-way miniImageNet classification experiment, TapNet shows the best performance in 1-shot, and shows a similar performance with a confidence interval overlapping with the confidence interval of the highest performance of TADAM. TADAM-a does not use task conditioning and is a model which uses a ResNet-12-based structure used in Prototypical Network and TapNet. TADAM-α uses a level of learning complexity which is similar to that of TapNet. TapNet has higher performance than that of TADAM-α, and TADAM-TC, which has higher performance than that of TapNet, uses an additional fully-connected layer for task conditioning.

In the tieredImageNet experiment of Table 2, the classification performance of the proposed TapNet algorithm is compared with the classification performance of the prior arts experimented by Liu et al. As a result of the comparison, TapNet shows the best performance in both 1-shot and 5-shot experiments, with a significant difference from the prior art.

6. t-SNE Analysis Result of the Embodiment of the Present Invention

FIG. 7 shows that the projection space and a neural network embedding space of TapNet which has learned by Omniglot data set are schematized by using t-SNE. Each class data is represented by a character image of the class, and the reference vector is represented by a character image in a circle. In the embedding space, the class images and the corresponding reference vectors are not located close to each other. However, it can be seen that, in the projection space, the character images and the data of the same class are located close to each other. Also, the projected images tend to be located far away from the reference vectors of other classes without simply being close to the corresponding reference vector. As a result, it can be found that the data of the same class are located close to each other on the basis of the same reference vector through projection onto the projection space and are located far from the data of other classes, so that the classification performance is improved. This separation of class data results from the fact that the projection space M is formed by calculating a null space by using $\bar{\phi}_k = \phi_k - (1/(N_c-1))\Sigma_{i \phi k}\phi_i$ instead of the original reference vector $\phi_k$ in the process of forming the projection space.

As a result, the embodiment of the present invention the meta-learning algorithm using the linear signal processing module which projects the output of the neural network onto a task-optimized null space. Signals in the original feature space are used through being linearly projected to another space where the actual classification is performed. The embedding neural network and the reference vectors according to classes are learned throughout all the episodes, and the projection space is formed suitable for a given episode. The combination of the neural network and the projection space shows excellent adaptability to new tasks. For various few-shot classification data sets, it was confirmed that the proposed meta-learning algorithm shows the best performance. In addition, the relation between the proposed TapNet and other distance-based meta-learning algorithms such as the memory-augmented neural network, etc., has been also studied.

The foregoing embodiments of the present invention may be implemented in the form of a program instruction which is executable by various computer components and may be recorded in a computer-readable recording medium. The computer-readable recording medium may include program instructions, data files, data structures and the like separately or in a combination thereof. The program instructions recorded in the computer-readable recording medium may be specially designed and configured for the purpose of the present invention or may be well-known and available to those skilled in the field of computer software. A magnetic medium such as a hard disk, a floppy disk and a magnetic disk, an optical recording medium such as a CD-ROM and DVD, a magnetic-optical medium such as a floptical disk, and a hardware device such as ROM, RAM, a flash memory and the like, which is specially configured to store and run program instructions are included as examples of the computer-readable recording medium. Not only a machine language code which is formed by a compiler but also high-level language code which can be executed by a computer using an interpreter is included as examples of the program instruction. The hardware device may be configured to operate as one or more software modules in order to perform the processes according to the present invention, and vice versa. The aspects of the present invention may take the form of hardware as a whole, software (including firmware, resident software, microcode, etc.) as a whole or a computer program product implemented in at least one computer readable medium in which a computer readable program code is implemented.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A data processing method by learning of a neural network, the data processing method comprising:
   obtaining a first set of output values by processing a first set of input values of a task by the neural network;
   forming a projection space on the basis of the first set of output values without learning;
   obtaining a second set of output values by processing a second set of input values out of input values of the task by the neural network;
   projecting the second set of output values onto the projection space; and
   performing processing the second set of output values in the projection space.

2. The data processing method by learning of a neural network of claim 1, wherein the forming a projection space is performed by linear processing.

3. The data processing method by learning of a neural network of claim 1, wherein the projecting the output value of the neural network onto the projection space is performed by linear processing.

4. The data processing method by learning of a neural network of claim 1,
   wherein the projection space is formed based on the first set of output values of the neural network and a reference vector set,
   and wherein the reference vector set is composed of one or a plurality of reference vectors and is learned together with the neural network.

5. The data processing method by learning of a neural network of claim 4, wherein the processing is performed in the projection space by using both a first set of result values obtained by projecting the second set of output values of the neural network onto the projection space and a second set of result values obtained by projecting the reference vector set onto the projection space.

6. The data processing method by learning of a neural network of claim 1, wherein the projection space is formed without using a gradient descent algorithm.

7. The data processing method by learning of a neural network of claim 1, wherein the neural network is a recurrent neural network (RNN) or a convolutional neural network (CNN).

8. The data processing method by learning of a neural network of claim 1,
   wherein the first set of input values is a support set and the second set of input values is a query set,
   and wherein the support set comprises a selected part of the input values of the task and label information on the corresponding selected part of the input values, and the query set comprises another selected part of the input values of the task other than the support set and label information on the corresponding another selected part of the input values.

9. The data processing method by learning of a neural network of claim 8, wherein, in the processing, on the basis of the second set of output values obtained after processing the query set through the neural network, the query set is classified in the projection space formed by using the first set of output values obtained after processing the support set through the neural network.

10. The data processing method by learning of a neural network of claim 9,
wherein the query set is classified in the projection space by using both a first set of result values obtained by projecting the second set of output values obtained by processing the query set through the neural network onto the projection space and a second set of result values obtained by projecting reference vectors within a reference vector set onto the projection space,
and wherein the reference vector set is composed of one or a plurality of the reference vectors and is learned together with the neural network.

11. The data processing method by learning of a neural network of claim 10,
wherein the query set is classified in the projection space by using distance values which are obtainable for a plurality of pairs between the first set of result values and the second set of result values,
and wherein the neural network and the reference vector set are updatable by using a loss based on the distance values obtained for all data within the query set.

12. The data processing method by learning of a neural network of claim 11, wherein each query data in the query set is classified in the projection space on the basis of the second predetermined result value having a distance value closest to the first result value corresponding to the query data.

13. The data processing method by learning of a neural network of claim 10,
wherein the projection space is a space for per-class mean vectors obtained from the first set of output values included in an output space of the neural network and the reference vector set corresponding to the per-class mean vectors are arranged close to each other,
and wherein the per-class mean vectors correspond to average values according to each class of the first set of output values obtained by processing the support set through the neural network.

14. The data processing method by learning of a neural network of claim 13, wherein the projection space is formed by using error vectors which are differences between the per-class mean vectors and the corresponding reference vectors.

15. The data processing method by learning of a neural network of claim 14, wherein the projection space is formed such that the error vector is 0 (null) for all classes in the projection space.

16. The data processing method by learning of a neural network of claim 9, wherein the projection space is formed without using a gradient descent algorithm.

17. The data processing method by learning of a neural network of claim 9, wherein the neural network is a recurrent neural network (RNN) or a convolutional neural network (CNN).

18. A computer-readable medium for recording a computer program for performing the method according to claim 1.

19. A data processing apparatus by learning of a neural network, the data processing apparatus comprising a processor which is implemented to execute an instruction readable by the data processing apparatus,
wherein the processor
obtains a first set of output values by processing a first set of input values of a task by the neural network,
forms a projection space on the basis of the first set of output values without learning,
processes a second set of input values out of input values of the task by the neural network,
projects the second set of output values onto the projection space, and
performs processing the second set of output values in the projection space.

20. The data processing apparatus by learning of a neural network of claim 19, wherein the forming a projection space is performed by linear processing.

21. The data processing apparatus by learning of a neural network of claim 19, wherein the projecting the output value of the neural network onto the projection space is performed by linear processing by the processor.

22. The data processing apparatus by learning of a neural network of claim 19,
wherein the projection space is formed based on the first set of output values of the neural network and a reference vector set by the processor,
and wherein the reference vector set is composed of one or a plurality of reference vectors and is learned together with the neural network.

23. The data processing apparatus by learning of a neural network of claim 22, wherein the processing is performed in the projection space by the processor by using both a first set of result values obtained by projecting the second set of output values of the neural network onto the projection space and a second set of result values obtained by projecting the reference vector set onto the projection space.

24. The data processing apparatus by learning of a neural network of claim 19, wherein the projection space is formed by the processor without using a gradient descent algorithm.

25. The data processing apparatus by learning of a neural network of claim 19, wherein the neural network is a recurrent neural network (RNN) or a convolutional neural network (CNN).

26. The data processing apparatus by learning of a neural network of claim 19,
wherein the first set of input values is a support set and the second set of input values is a query set,
and wherein the support set comprises a selected part of the input values of the task and label information on the corresponding selected part of the input values, and the query set comprises another selected part of the input values of the task other than the support set and label information on the corresponding another selected part of the input values.

27. The data processing apparatus by learning of a neural network of claim 26, wherein, on the basis of the second set of output values obtained after processing the query set through the neural network, the processor classifies the query set in the projection space formed by using the first set of output values obtained after processing the support set through the neural network.

28. The data processing apparatus by learning of a neural network of claim 27,
wherein the processor classifies the query set in the projection space by using both a first set of result values obtained by projecting the second set of output values obtained by processing the query set through the neural network onto the projection space and a second set of result values obtained by projecting reference vectors within a reference vector set onto the projection space,
and wherein the reference vector set is composed of one or a plurality of the reference vectors and is learned together with the neural network.

29. The data processing apparatus by learning of a neural network of claim 28,
wherein the processor classifies the query set in the projection space by using distance values which are obtainable for a plurality of pairs between the first set of result values and the second set of result values,
and wherein the neural network and the reference vector set are updatable by using a loss based on the distance values obtained for all data within the query set.

30. The data processing apparatus by learning of a neural network of claim 29, wherein the processor classifies each query data in the query set in the projection space on the basis of the second predetermined result value having a distance value closest to the first result value corresponding to the query data.

31. The data processing apparatus by learning of a neural network of claim 29,
wherein the projection space is a space for per-class mean vectors obtained from the first set of output values included in an output space of the neural network and the reference vector set corresponding to the per-class mean vectors are arranged close to each other,
and wherein the per-class mean vectors correspond to average values according to each class of the first set of output values obtained by processing the support set through the neural network.

32. The data processing apparatus by learning of a neural network of claim 31, wherein the processor forms the projection space by using error vectors which are differences between the per-class mean vectors and the corresponding reference vectors.

33. The data processing apparatus by learning of a neural network of claim 32, wherein the processor forms the projection space such that the error vector is 0 (null) for all classes in the projection space.

34. The data processing apparatus by learning of a neural network of claim 27, wherein the neural network is a recurrent neural network (RNN) or a convolutional neural network (CNN).

35. The data processing apparatus by learning of a neural network of claim 27, wherein the query set is classified through the projection onto the projection space without using a gradient descent algorithm.

* * * * *